(12) United States Patent
Glass

(10) Patent No.: US 6,513,157 B1
(45) Date of Patent: Jan. 28, 2003

(54) SYSTEM AND METHOD FOR DYNAMICALLY AGGREGATING OBJECTS

(75) Inventor: Graham W. Glass, Dallas, TX (US)

(73) Assignee: Recursion Software, Inc., Frisco, TX (US)

( * ) Notice: Subject to any disclaimer, the term of this patent is extended or adjusted under 35 U.S.C. 154(b) by 0 days.

(21) Appl. No.: 09/451,496

(22) Filed: Nov. 30, 1999

(51) Int. Cl.[7] .................................................. G06F 9/44
(52) U.S. Cl. ...................................... 717/165; 717/162
(58) Field of Search ................................ 717/165, 162, 717/163, 164, 166, 167, 107, 108, 168–173, 116; 709/331, 332, 315, 321; 707/103 R, 103 Y, 103 Z, 3, 4.5

(56) References Cited

U.S. PATENT DOCUMENTS

| | | | | |
|---|---|---|---|---|
| 5,778,227 A | * | 7/1998 | Jordan | 717/163 |
| 6,195,794 B1 | * | 2/2001 | Buxton | 717/168 |
| 6,212,574 B1 | * | 4/2001 | O'Rourke et al. | 709/321 |
| 6,345,382 B1 | * | 2/2002 | Hughes | 717/100 |
| 6,347,342 B1 | * | 2/2002 | Marcos et al. | 709/310 |

OTHER PUBLICATIONS

Bowers. Some Principles for the Encapsulation of The Behavior of Aggregate Objects. IEEE. 1993. pp. 6/1–6/4.*
Henderson–Sellers et al. What is This Thing Called Aggregation? IEEE. Jun. 1999. pp. 236–250.*

* cited by examiner

Primary Examiner—Gregory Morse
Assistant Examiner—Wei Zhen
(74) Attorney, Agent, or Firm—Baker Botts L.L.P.

(57) ABSTRACT

A method for dynamically extending functionality of an object without modifying executable code includes the steps of first identifying an existing object as a primary facet object (16) and creating an aggregate object (14). The primary facet object (16) is linked to the aggregate object (14). One or more facet objects (28) that extend a functionality of the primary facet object (16) are added to the aggregate object (14). The particular facet objects (28) linked to the aggregate object (14) is located that has a class that equals or extends a requested class. A reference to the particular facet object (28) is returned and the particular facet object (28) is invoked using the returned reference.

24 Claims, 4 Drawing Sheets

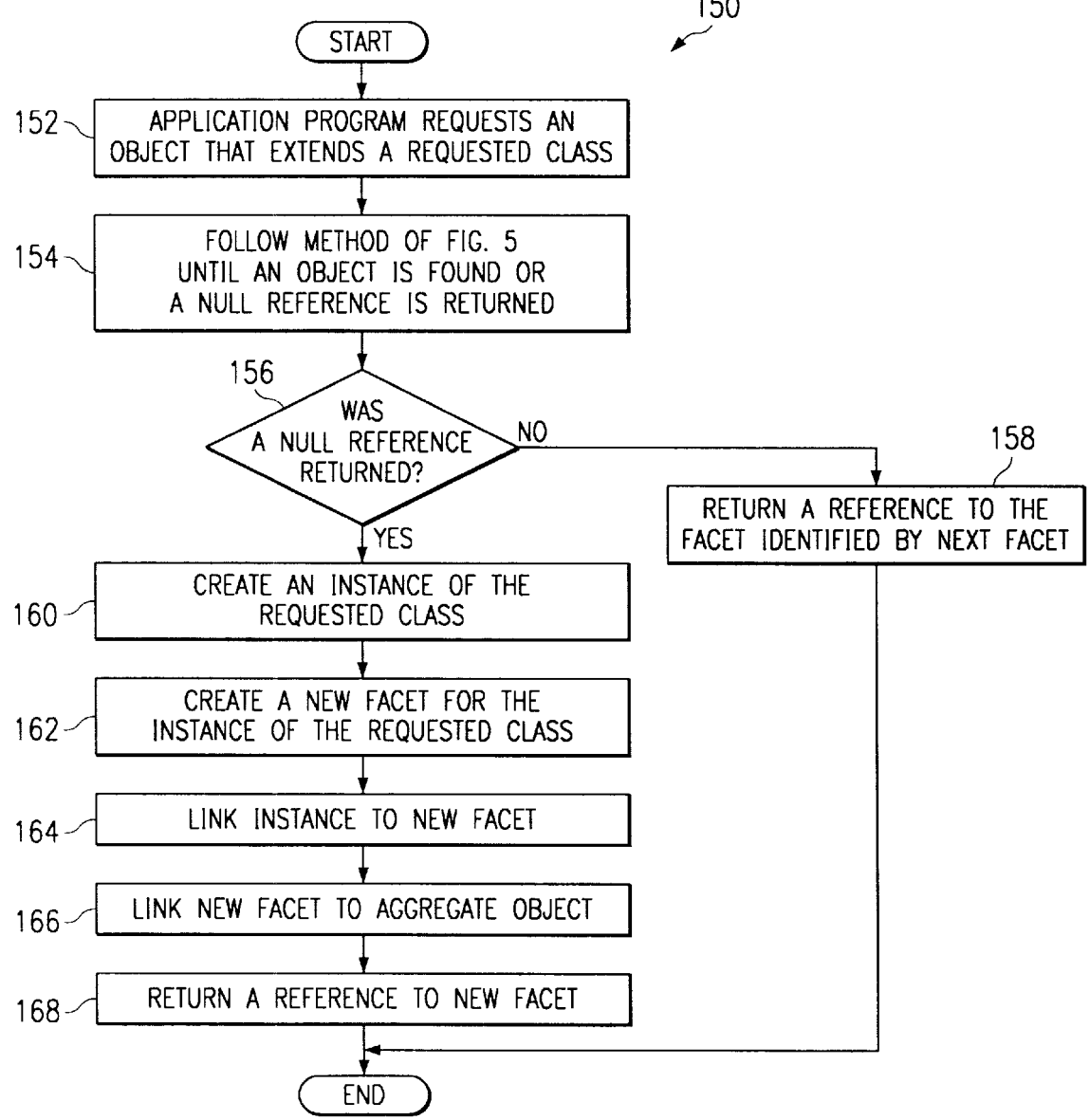

SYSTEM AND METHOD FOR DYNAMICALLY AGGREGATING OBJECTS

TECHNICAL FIELD OF THE INVENTION

The present invention relates in general to object-oriented technologies and more particularly to a system and method for dynamically aggregating objects.

BACKGROUND OF THE INVENTION

In object oriented programming, real world objects are modeled by software objects that have encapsulated therein special procedures and data elements. In object-oriented programming terminology, procedures are referred to as methods. To avoid having to redefine the same methods and data members for each and every occurrence of an object, object-oriented programming provides the concept of classes. An inherent structure of one or more levels of increasingly more specialized classes is created to provide templates that define the methods and variables to be included in the objects of each class. The classes at the lower levels of the inheritance structure inherit the behavior, methods, and variables of the classes above. Classes above a certain class in an inheritance structure are referred to as parent classes setting up a parent-child relationship. Therefore, an object belonging to a class is a member of that class, and contains the special behavior defined by the class. In this manner, each object is an instance of a defined class or template and the need to redefine the methods and data members for each occurrence of the object is eliminated.

One example of an object-oriented programming language is Java, developed by Sun Microsystems. To define a class in Java, the programmer creates a .java file containing the source code to define the class. The .java file is compiled to create a .class file containing the executable code to define the class. Instances of the .class file are instantiated to create an object containing data and methods defined by the .class file.

Object-oriented programming is a method of programming that abstracts a computer program into manageable sections. The key to object-oriented programming is the concept of encapsulation. Encapsulation is a method by which the subroutines, or methods, that manipulate data are combined with the declaration and storage of that data. This encapsulation prevents the data from arbitrarily being accessed by other programs' subroutines, or objects. When an object is invoked, the associated data is available and can be manipulated by any of the methods that are defined within an object to act upon the data.

The basic component of encapsulation is a class. A class is an abstraction for a set of objects that share the same structure and behavior. An object is a single instance of a class that retains the structure and behavior of the class. Objects also contain methods that are the processes by which an object is instructed to perform some procedure or manipulation of data that it controls. Classes may also be characterized by their interface which defines the elements necessary for proper communication between objects.

Often, a programmer needs to add functionality to an existing class of objects but either does not want to change the existing .class file or does not have access to the source code and, therefore, does not have the ability to alter the source code. In addition, the programmer may not want to alter the functionality of the existing .class file since a .class file may be used in more than one application program. Therefore, it is desirable to add functionality to an existing class of objects during the execution of an application program without altering the associated source code.

SUMMARY OF THE INVENTION

From the foregoing, it may be appreciated that a need has arisen for a system and method for dynamically aggregating objects to add functionality to an existing class of objects without altering the associated source code. In accordance with the present invention, an improved system and method for dynamically aggregating objects are provided which substantially eliminate or reduce disadvantages and problems associated with conventional methods for adding functionality to an existing class of objects.

According to an embodiment of the present invention, there is provided a method where an existing object is identified as a primary object and an aggregate object is created. The primary object is linked to the aggregate object. One or more facet objects that extend a functionality of the primary object are added to the aggregate object. A facet object linked to the aggregate object that has a class that equals or extends a requested class is located. A reference to the located facet object is returned. The located facet object is invoked using the returned reference.

In another embodiment of the present invention, there is provided a system for dynamically adding functionality to existing objects in an object oriented environment that comprises an aggregate object and a primary object linked to the aggregate object. One or more facet objects are linked to the aggregate object and provide additional methods and functionality for the primary object. The aggregate object, primary object, and one or more facet objects function together as a single logical object.

The present invention provides various technical advantages over conventional methods for adding functionality to an existing class of objects. For example, one technical advantage is providing a method for adding functionality to an existing class of objects without altering associated source code. In particular, the method for dynamically aggregating objects provides a method for aggregating objects so that any object within the aggregation can utilize methods of other aggregated objects. In addition, dynamically aggregating objects provides for more straightforward design and development since programmers do not need to know the technical details of the aggregated objects. Other technical advantages may be readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, in which:

FIG. 6 illustrates a flow diagram illustrating a method for adding a class to an aggregate object.

DETAILED DESCRIPTION OF THE INVENTION

Figure 1:
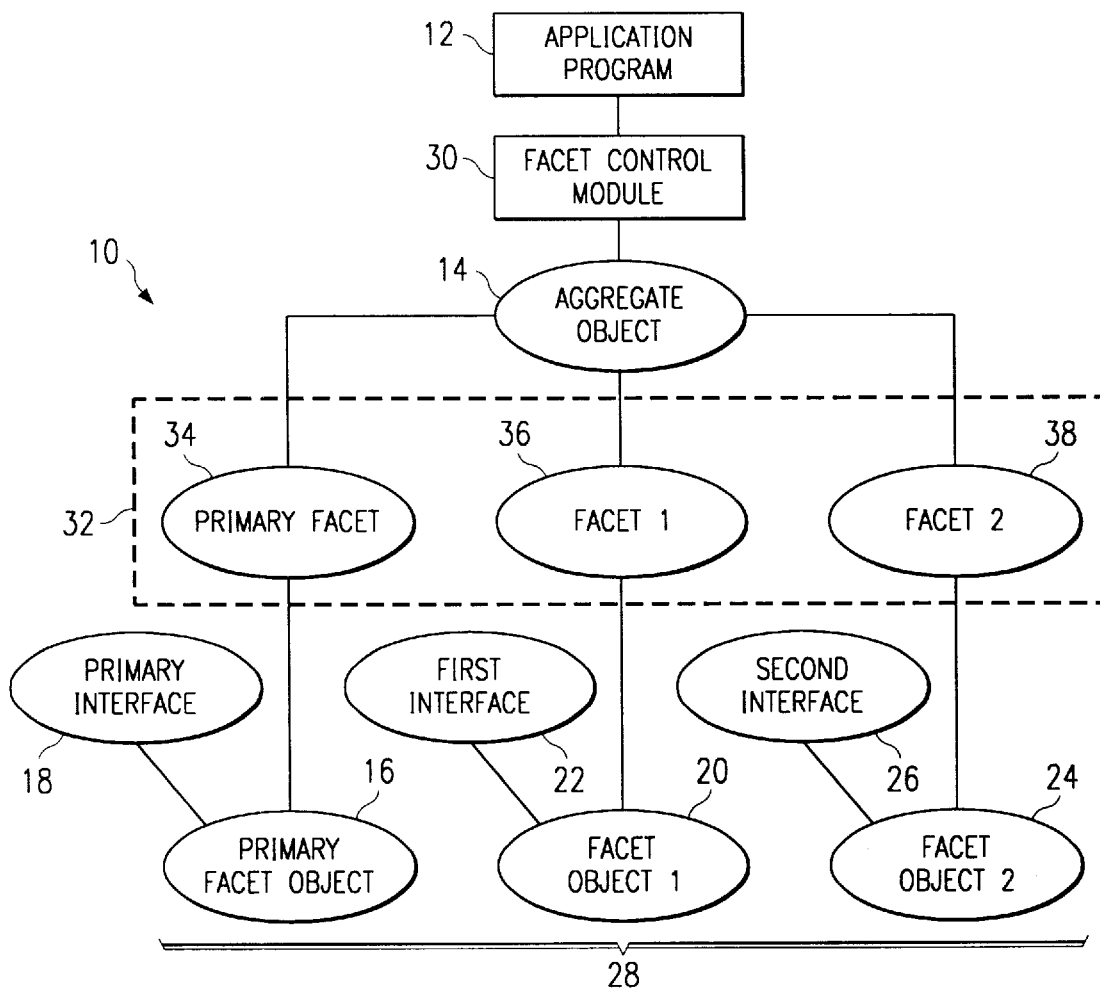
FIG. 1 illustrates a block diagram of an application program utilizing aggregate objects.

Referring to FIG. 1, an application program using dynamically aggregated objects is generally indicated at 10. An application program 12 may access one or more aggregate objects 14 through a facet control module 30. Aggregate object 14 includes a set of facets 32 that may contain one or more facets such as a primary facet 34, a first facet 36, and a second facet 38. One or more facet objects 28 are linked to the set of facets 32 in a one to one correspondence. A primary facet object 16 having a primary interface 18 is linked to primary facet 34, a first facet object 20 having a first interface 22 is linked to first facet 36, and a second facet object 24 having a second interface 26 is linked to second facet 38.

Aggregate object 14 is an aggregation of one or more facet objects 28 within an object-oriented environment. Aggregate object 14 and the associated facet objects 28 function as a single logical object within the object-oriented environment. A change to one of the facet objects 28 creates a logical change in the other facet objects 28 and aggregate object 14. For example, if one of the facet objects 28 moves to a different processing environment, or address space, the aggregate object 14 to which the particular facet object 28 is linked and any other associated facet objects 28 will move as a single logical object to the new processing environment, or address space. Primary facet object 16, first facet object 20, and second facet object 24 represent a group of one or more facet objects 28.

Each aggregate object 14 communicates directly with its associated set of facets 32. Each facet within a set of facets 32 is linked to a particular facet object 28. Each facet in the set of facets 32 contains basic information related to its associated facet object 28 to facilitate use of the aggregate object 14 within application program 12. The information contained in each facet in the set of facets 32 for its associated facet object 28 includes the class of the facet object 28 and any interfaces implemented by the facet object 28. In one embodiment, each facet in set of facets 32 is a proxy object created from the associated facet object 28. The proxy object is created by using Java Reflection to determine a particular facet object's 28 name, class, and interfaces. This information is then packaged into a facet in set of facets 32. The particular facet in set of facets 32 is an object that includes the name, class, and interfaces for the associated facet object 28. An interface in an object oriented environment defines the format and information needed to communicate with a particular object. An interface may be referred to as the public view of the object.

During application program development, the software developer may utilize aggregate objects 14 to extend the functionality of existing objects without modifying source code. The software developer extends functionality of an existing object by placing it in an aggregate object 14 as the primary facet object 16 and aggregating additional objects within aggregate object 14 as facet objects 28. Within application program 12, a particular object may be the primary facet object 16 of only one aggregate object 14. Each aggregate object 14 in application program 12 will have a unique primary facet object 16. In one embodiment, a software developer desires to extend the functionality of a specified object to add additional functions such as mobility within a distributed processing environment or the ability to function as an agent within a distributed processing environment. Another example of adding functionality to an existing object would be adding repair history to a car object or adding a bonus plan to an employee object.

The software developer dynamically creates an aggregate object 14 with the specified object as the associated primary facet object 16. The term "dynamically" is used here to refer to using program statements during execution of application program 12 to create aggregate object 14. The software developer then dynamically adds first facet object 20 and second facet object 24 to aggregate object 14. First facet object 20 and second aggregate object 24 provide additional functionality for primary facet object 16. Any method of any facet object 28 may affect all facet objects 28 within aggregate object 14. Therefore, invoking a method on first facet object 20 will effect a change in primary facet object 16.

Application program 12 may create and utilize one or more aggregate objects 14. Each aggregate object 14 has one or more associated facet objects 28. Facet objects 28 may be added and deleted as application program 12 progresses depending upon processing requirements. To access a particular facet object 28, application program 12 may request access to the particular facet object 28 that extends the functionality of a primary facet object 16 by requesting a class or interface using commands that invoke facet control module 30. Facet control module 30 then scans the set of facets 32 associated with the aggregate object 14 identified in the facet control system command until locating the particular facet object 28 that has a class that equals or extends the requested class or implements the requested interface. Facet control module 30 returns a reference to the first facet in the set of facets 32 that has a class that equals or extends the requested class or implements the requested interface. Application program 12 can then invoke the particular facet object 28 by using the returned reference to the facet in the set of facets 32. In another embodiment, facet control system 30 may return a list of all facets within the set of facets 32 with associated facet objects 28 that have a class that equal or extend the requested class or implement the requested interface. Application program 12 then determine which facet object 28 in the returned reference list to invoke.

If no facet object 28 exists that has a class that equals or extends the requested class or implements the requested interface, a not-found condition is returned to application program 12 as a null reference. Application program 12 can then determine whether a new aggregate object 14 should be created, whether an object should be added to an existing aggregate object 14 as an additional facet object 28, or whether appropriate error handling procedures should be performed.

Figure 2:
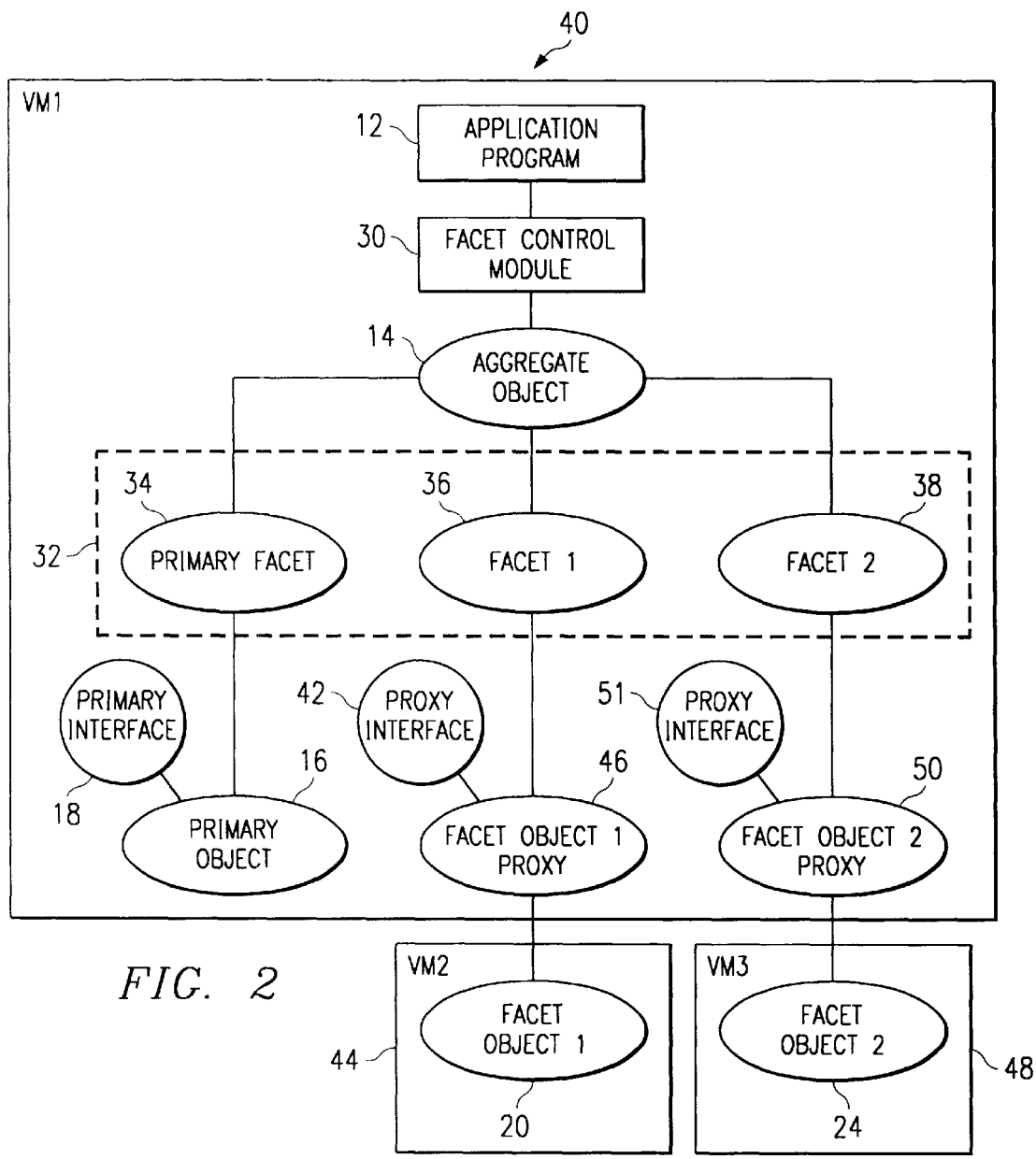
FIG. 2 illustrates a block diagram of the application program utilizing aggregate objects where facet objects are distributed in different processing environments.

Referring to FIG. 2, a system with an application program 12 using dynamically aggregated objects in a distributed processing environment is generally indicated at 40. The structure and operation of system 40 is the same as system 10 except that facet objects 28 may exist within different address spaces in a distributed processing environment and be accessed by aggregate object 14 using proxies.

In system 40, application program 12, facet control module 30, aggregate object 14, set of facets 32 and primary facet object 16 all exist within a first environment 40. First facet object 20 exists within a second environment 44. Communications between aggregate object 14 and first facet object 20 are facilitated by using an appropriate distributed processing system such as an object request broker. In one embodiment, a first facet object proxy 46 resides in first environment 40 and is logically coupled to first facet object 20 in second environment 44. First facet object proxy 46 may be a conventional proxy object created from first facet object 20. First facet object proxy 46 has an interface 47 modeled on first interface 22. Interface 47 has a format and needed information similar to first interface 22. Second facet object 24 resides in a third environment 48. Communications between aggregate object 14 and second facet object 24 are facilitated by using an appropriate distributed processing system such as an object recognition broker. In one embodiment, a second facet object proxy 50 resides in first environment 40 and provides communications between aggregate object 14 and second facet object 24. Second facet object proxy 50 may be a conventional proxy object created from second facet object 24. Second facet object proxy 50 has an interface 51 modeled on second interface 26. Interface 51 has a format and needed information similar to second interface 26.

Figure 3:
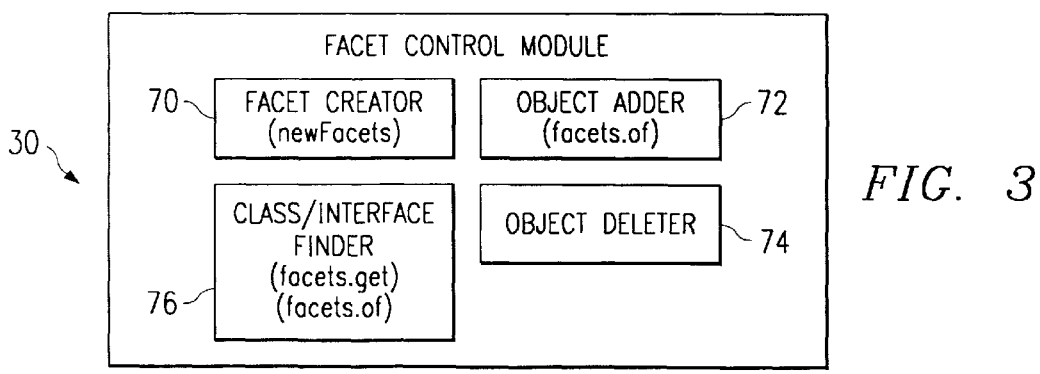
FIG. 3 illustrates a block diagram of a facet control module used within the application program.

Referring to FIG. 3, a facet control module is generally indicated at 30. Facet control module 30 provides dynamic aggregation of existing objects for application program 12. Facet control module 30 consists of several modules including a facet creator 70, an object adder 72, an object deleter 74, and a class/interface finder 76. The functionality of facet control module 30 will be discussed with reference to the flow diagrams of FIGS. 4, 5 and 6.

Figure 4:
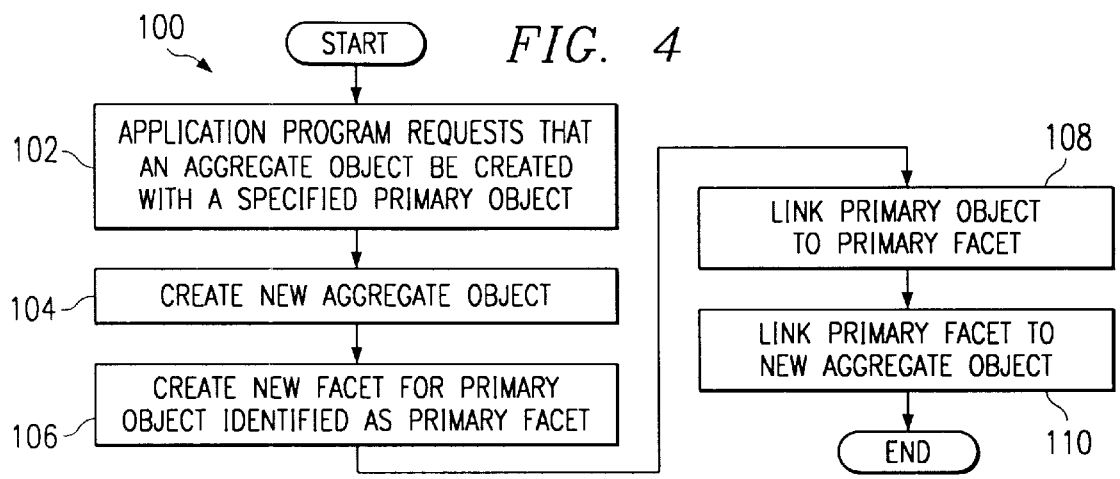
FIG. 4 illustrates a flow diagram illustrating creation of aggregate objects.

Referring to FIG. 4, a flow diagram illustrating a method for dynamically aggregating objects is generally indicated at 100. The method commences at step 102 where application program 12 requests that an aggregate object 14 be created with a specified primary object. The method proceeds to step 104 where facet control module 30 receives the request and forwards it to facet creator 70 to create an aggregate object 14 with a primary facet object 16 of the specified object named in the create aggregate object request. A particular object may be the primary facet object 16 of only one aggregate object 14. The method proceeds to step 106 where a new facet 32 for the specified primary facet object 16 is created as primary facet 34. The method proceeds to step 108 where the specified primary facet object 16 is identified and linked to primary facet 34. The method proceeds to step 110 where primary facet 34 is linked to the new aggregate object 14.

In one embodiment, the following syntax may be used to create an aggregate object 14:

Facets myFacets=new Facets (myPrimary);

where myPrimary identifies an existing object which will become primary facet object 16 within the newly created aggregate object 14 identified as myFacets. Facet control module 30 creates an aggregate object 14 identified as myFacets. Next, facet control module 30 creates a primary facet 34 identified as primaryFacet. Primary facet 34 is linked to aggregate object 14. Next, facet control module 30 creates a primary facet object 16 identified as myPrimary. Primary facet object 16 is linked to primary facet 34. Facet control module 30 creates primary facet 34 such that primary facet 34 contains the class of primary facet object 16 and the interfaces implemented by primary facet object 16.

Figure 5:
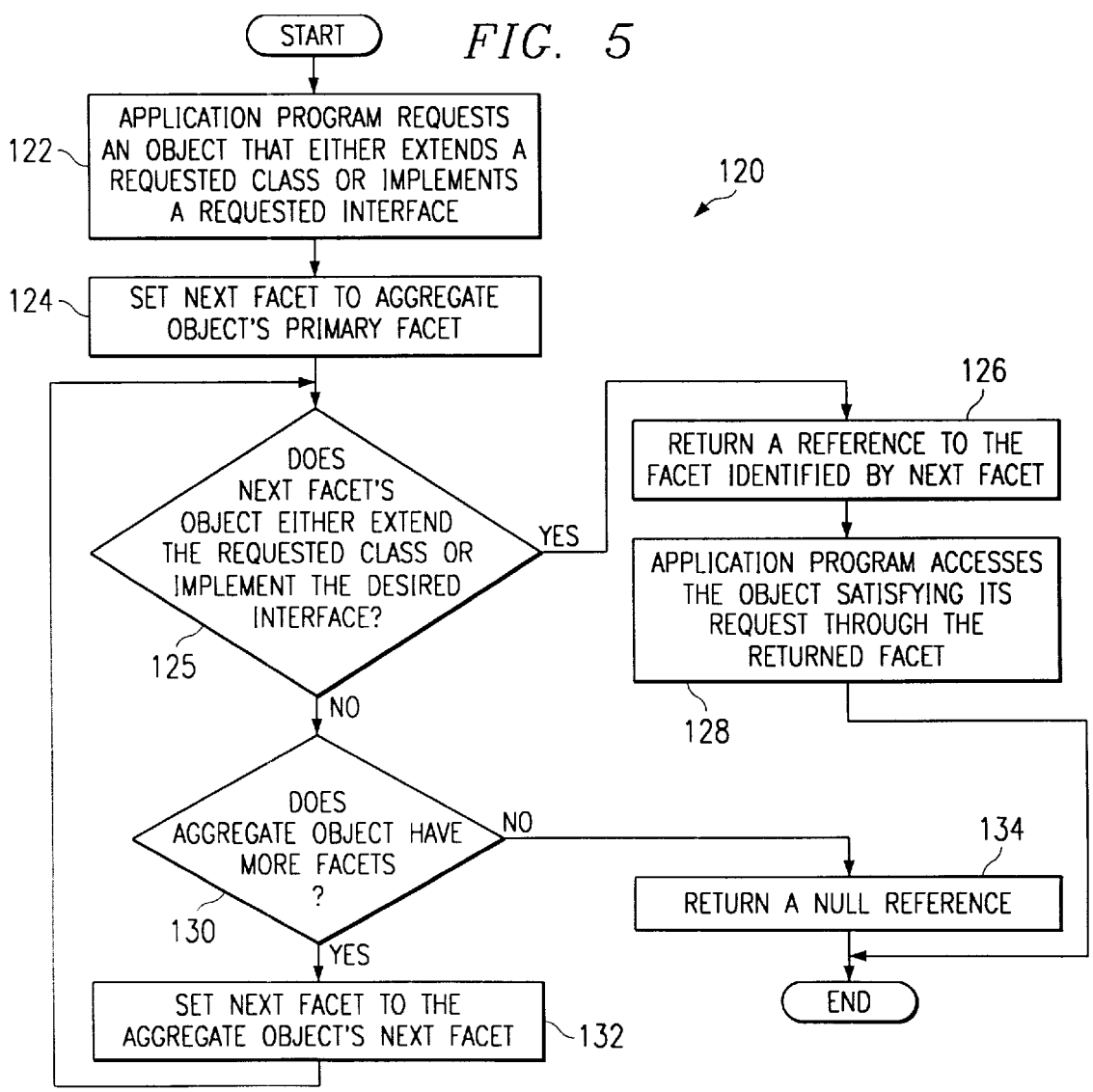
FIG. 5 illustrates a flow diagram illustrating a method of locating an object that extends a requested class or implements a requested interface.

Referring to FIG. 5, a flow diagram illustrating a method for locating an object that extends a requested class or implements a requested interface within an aggregate object 14 is generally indicated at 120. The method proceeds to step 122 where application program 12 requests that facet control module 30 locate a facet object 28 that has a class that equals or extends a requested class or implements a requested interface. Upon receiving this type of request, facet control module 30 forwards the request to class/interface finder 76. In one embodiment, the following syntax may be used to request access to a facet object 28 that has a class that equals or extends the requested class or implements the requested interface:

myFacets.get ("class name");

where myFacets.get identifies the aggregate object 14 (myFacets) and the operation (get) for class/interface finder 76. The class name in the above example may also identify a requested interface name. The method proceeds to step 124 where a facet reference is set to aggregate object's 14 primary facet, primary facet 34. Primary facet 34 should be the first facet in the set of facets 32.

The method proceeds to decisional step 125 where class/interface finder 76 determines if the facet referenced by facet-reference has a class that equals the requested class, has a class that extends the requested class, or implements the requested interface. If the facet in the set of facets 32 identified by the facet-reference meets one of the above tests, the Yes branch of decisional step 125 proceeds to step 126 where class/interface finder 76 returns a reference to the facet in the set of facets 32 identified by the facet-reference. The method proceeds to step 128 where application program 12 uses the returned reference to identify the facet object 28 through the reference to a facet in the set of facets 32. Application program 12 then invokes the facet object 28. After step 128, the method terminates.

Returning to decisional step 125, if the facet in the set of facets 32 identified by the facet-reference does not meet one of the aforementioned tests, the No branch of decisional step 125 proceeds to decisional step 130 where class/interface finder 76 determines whether aggregate object 14 has more facets within its associated set of facets 32. If the set of facets 32 includes more facets, the Yes branch of decisional step 130 proceeds to step 132 where the facet-reference is set to the next facet, first facet 36 in this example, in the set of facets 32 associated with aggregate object 14. The method returns to decisional step 125 to process the next facet identified by the facet-reference.

Returning to decisional step 130, if the set of facets 32 associated with aggregate object 14 does not include more facets, the No branch of decisional step 130 proceeds to step 134 where a null reference is returned. Application program 12 would then perform appropriate error processing upon receipt of the null reference. After step 134, the method terminates.

Referring to FIG. 6, a flow diagram illustrating a method for adding objects to an aggregate object 14 is generally indicated at 150. The method commences at step 152 where application program 12 requests a facet object 28 that has a class that equals or extends a requested class. In one embodiment, the following syntax may be used to add objects to a aggregate object 14 as facet objects 28:

myFacets.of ("class name");

where the desired aggregate object 14 is identified (myFacets) and the desired operation is also identified (.of). "Class name" refers to an existing .class file. When adding facet objects to aggregate object 14, class names should be used so that an instance of the class may be generated and added to aggregate object 14 as a facet object 28.

The method proceeds to step 154 where the method of FIG. 5 identified in steps 122–126 and 130–134 is performed until a facet within the set of facets 32 associated with aggregate object 14 is found that has a class that equals or extends the requested class or a null reference is returned.

The method proceeds to decisional step 156 where a determination is made regarding whether a null reference was returned. If a null reference was not returned, the No branch of decisional step 156 proceeds to step 158 where the reference received from step 126 in the method of FIG. 5 is returned. If a null reference is not received, the requested class has already been added to the set of facets 32 in aggregate object 14 and processing may continue. After step 158 the method terminates.

Returning to decisional step 156, if a null reference is received, the Yes branch of decisional step 156 proceeds to step 160 where object adder 72 creates an instance of the requested class. The method proceeds to step 162 where object adder 72 creates a new facet for the instance of the requested class. Object adder 72 creates the new facet by adding the requested class and the interfaces implemented by that class to the new facet. The new facet is an object that summarizes available information regarding the associated facet object that in this example is the created instance of the requested class. The new facet becomes a member of the set of facets 32 associated with the aggregate object 14.

The method proceeds to step 164 where object adder 72 links the instance of the requested class created in step 160 to the new facet created in step 162. The method proceeds to step 166 where object adder 72 links the new facet created in step 162 to the aggregate object 14. The method proceeds to step 168 where a reference to the new facet created in step 162 is returned. After step 168, the method terminates.

In one embodiment, the facets.of command that is used to add objects to an existing aggregate object 14 may be used by software developers when they have determined that a requested class should be part of aggregate object 14 but they are not sure that the requested class has been added to facet objects 28 that are associated with aggregate object 14. By using this type of command, the software developer requests a facet object 28 that has a class that equals or extends a requested class and is guaranteed that a reference to a facet object 28 will be returned.

In addition to the above-referenced sample commands, one embodiment of the present invention includes the following command to determine the primary facet object 16 of aggregate object 14:

myFacets.getPrimary ( );

where the desired aggregate object 14 is identified as myFacets and the desired operation is identified as getPrimary. The sample command returns a reference to primary facet object 16.

Another sample command from one embodiment of the present invention includes the following command to determine the members of set of facets 32 associated with aggregate object 14;

myFacets.getFacets ( );

where the desired aggregate object 14 is identified as myFacets and the desired operation is identified as getFacets. The sample command returns a list of each facet object 28 associated with aggregate object 14.

Object deleter 74 of facet control module 30 provides a software developer with the ability to delete a specified object from facet objects 28. The software developer identifies the particular facet object 28 to be removed from aggregate object 14 and instructs facet control module 30 to remove the specified facet object from aggregate object 14. Object deleter 74 physically deletes the associated facet in set of facets 32 and removes the link between the specified facet object and aggregate object 14. If the specified facet object has no remaining references, an operating system of the object oriented environment may remove the specified facet object from the object oriented environment during a garbage collection procedure.

Thus, it is apparent that there has been provided in accordance with the present invention, a system and method for dynamically aggregating objects that satisfies the advantages set forth above such as adding additional functionality to existing objects without altering source code. Although the present invention and its advantages have been described in detail, it should be understood that various changes, substitutions, and alterations may be readily apparent to those skilled in the art and may be made herein without departing from the spirit and the scope of the present invention as defined by the following claims.

What is claimed is:

1. A method for dynamically extending functionality of an object in an object oriented environment without modifying executable code, comprising:

identifying an existing object as a primary facet object;

creating an aggregate object;

linking the primary facet object to the aggregate object;

adding one or more facet objects to the aggregate object, the one or more facet objects extending a functionality of the primary facet object;

locating a facet object linked to the aggregate object that has a class equal to a requested class;

returning a reference to the located facet object in response to locating a facet object linked to the aggregate object that has a class that equals or extends the requested class;

invoking the located facet object using the returned reference.

2. The method of claim 1, further comprising returning a null reference in response to not locating a facet object linked to the aggregate object that has a class equal to the requested class.

3. The method of claim 2, further comprising:

adding an instance of the requested class to the aggregate object as a facet object that extends the functionality of the primary facet object in response to the null reference.

4. The method of claim 1, further comprising:

locating a facet object linked to the aggregate object that implements a requested interface; and returning a reference to the located facet object in response to locating a facet object linked to the aggregate object that implements the requested interface.

5. The method of claim 1, further comprising:

deleting one of the one or more facet objects from the aggregate object.

6. The method of claim 1, wherein the step of linking the primary facet object to the aggregate object includes linking the primary facet object to a facet item that is further linked to the aggregate object, the facet item including a class of the primary facet object and a list of interfaces implemented by the primary facet object.

7. The method of claim 1, wherein the step of adding one or more facet objects to the aggregate object includes linking each of the one or more facet objects to an associated facet item that is further linked to the aggregate object.

8. The method of claim 1, wherein the step of returning a reference to the located facet object includes:

returning a reference to the one facet object in response to only one facet object in the aggregate object has a class that equals or extends the requested class, and returning a reference to the first facet object that has a class that equals or extends the requested class in response to more than one facet object in the aggregate object has a class that equals or extends the requested class.

9. The method of claim 1, wherein the step of returning a reference to the located facet object includes:

returning a list of references to all facet objects that have a class that equals or extends the requested class; and determining which facet object on the list of references to invoke.

10. The method of claim 1, further comprising:

requesting a list of the facet objects linked to the aggregate object; and returning a list of the facet objects linked to the aggregate object.

11. The method of claim 1, further comprising:

requesting the primary facet object linked to the aggregate object; and returning a reference to the primary facet object linked to the aggregate object.

12. A computer readable medium having code for dynamically adding functionality to existing objects in an object oriented environment, the code comprising:

an aggregate object;

a primary facet object linked to the aggregate object; and one or more facet objects linked to the aggregate object, the one or more facet objects providing additional methods and functionality for the primary facet object, wherein the aggregate object, primary object, and one or more facet objects function as a single logical object, wherein a particular facet object implements a particular interface being requested, the particular facet object receiving a reference to initiate its invocation.

13. The computer readable medium of claim 12, wherein the one or more facet objects adds methods and functionality to the aggregate object and the primary facet object without modifying an executable code of the primary facet object.

14. The computer readable medium of claim 12, wherein the code further comprises:

an application program operable to dynamically create and use the aggregate object.

15. The computer readable medium of claim 12, wherein the code further comprises:

a primary facet object linked to a primary facet, the primary facet linked to the aggregate object; and one or more facet objects linked to an associated facet, each facet associated with one of the one or more facet objects further linked to the aggregate object.

16. A computer readable medium having code for dynamically adding functionality to existing objects in an object oriented environment, the code comprising:

a facet creator module operable to create an aggregate object having a specified object as a primary facet object;

an object adder module operable to add one or more facet objects to the aggregate object, the facet objects providing additional functionality for the primary facet object;

a class finder module operable to locate a facet object associated with the aggregate object having a class that equals or extends a requested class, the class finder module operable to return a reference to the located facet object; and an interface finder module operable to locate a facet object associated with the aggregate object that implements a requested interface, the interface finder module operable to return a reference to the located facet object.

17. The computer readable medium of claim 16, wherein the code further comprises:

an object deleter module operable to delete a specified facet object from a specified aggregate object.

18. The computer readable medium of claim 16, wherein the class finder module is further operable to return a null reference in response to not locating a facet object associated with the aggregate object that has a class that equals or extends the requested class.

19. The computer readable medium of claim 18, wherein the object adder module is further operable to create an instance of the requested class and add the instance to the aggregate object in response to the null reference.

20. The computer readable medium of claim 16, wherein the code further comprises:

a facet finder module operable to generate a list of all facet objects associated with a requested aggregate object.

21. The computer readable medium of claim 16, wherein the code further comprises:

a primary facet object finder module operable to return a reference to a primary facet object associated with a requested aggregate object.

22. The computer readable medium of claim 16, wherein the class finder module is further operable to return a list of references to all facet objects associated with the aggregate object having a class that equals or extends the requested class.

23. The computer readable medium of claim 16, wherein the interface finder module is further operable to return a list of references to all facet objects associated with the aggregate object that implement the requested interface.

24. The computer readable medium of claim 16, wherein the facet creator module is operable to create a primary facet linked to the aggregate object and the primary facet object, the object adder module is operable to create a facet linked to the aggregate object and an added facet object.

* * * * *